US012667035B2

(12) United States Patent
Yeomans

(10) Patent No.: US 12,667,035 B2
(45) Date of Patent: Jun. 30, 2026

(54) HYDRAULIC TOP LINK

(71) Applicant: Digga Australia Pty. Ltd., Yatala (AU)

(72) Inventor: Allan James Yeomans, Surfers Paradise (AU)

(73) Assignee: DIGGA AUSTRALIA PTY. LTD., Yatala (AU)

( * ) Notice: Subject to any disclaimer, the term of this patent is extended or adjusted under 35 U.S.C. 154(b) by 567 days.

(21) Appl. No.: 18/193,519

(22) Filed: Mar. 30, 2023

(65) Prior Publication Data

US 2024/0138278 A1 May 2, 2024

(30) Foreign Application Priority Data

Nov. 1, 2022 (AU) ................................. 2022016460
Feb. 7, 2023 (AU) ................................. 2023200655

(51) Int. Cl.
*A01B 63/00* (2006.01)
*A01B 63/22* (2006.01)
*A01B 73/00* (2006.01)

(52) U.S. Cl.
CPC ............ *A01B 63/008* (2013.01); *A01B 73/00* (2013.01); *A01B 63/22* (2013.01)

(58) Field of Classification Search
CPC ....... A01B 63/00; A01B 63/008; A01B 63/02; A01B 63/10; A01B 63/22; A01B 73/00

USPC .................... 172/1, 452, 459, 461, 478, 503
See application file for complete search history.

(56) References Cited

U.S. PATENT DOCUMENTS

| | | | | |
|---|---|---|---|---|
| 9,351,437 | B2 * | 5/2016 | Friesen | ................. A01B 73/048 |
| 2013/0284469 | A1 * | 10/2013 | Barnett | ................. A01D 43/06 |
| | | | | 172/452 |
| 2018/0317373 | A1 * | 11/2018 | Nielsen | ................. A01D 34/661 |

OTHER PUBLICATIONS

Merriam-Webster definition of the word "sliding"; https://www.merriam-webster.com/dictionary/sliding (Year: 2025).*

* cited by examiner

*Primary Examiner* — Christopher J Sebesta
*Assistant Examiner* — Evan A Bregel
(74) *Attorney, Agent, or Firm* — Polson Intellectual Property Law P.C.; Margaret Polson; Christopher Sylvain

(57) ABSTRACT

A device for configuring a plough between a use configuration and a transport configuration is provided, the device comprising an elongated support and an actuator connected with the elongated support, wherein the elongated support is for sliding connection with the plough, and the actuator is for actuating connection with the plough, and wherein when the elongated support and the actuator are connected with the plough, actuation of the actuator can slide the plough relative to the elongated support to configure the plough between the use configuration and the transport configuration. Related systems and methods are also provided.

17 Claims, 12 Drawing Sheets

100

100

100

HYDRAULIC TOP LINK

CROSS REFERENCE APPLICATIONS

This application claims priority to Australia Patent Application No. 2023200655 filed Feb. 7, 2023 and Australian design application 202216460 filed Nov. 1, 2022, each of which is hereby incorporated by reference for all purposes.

FIELD

This invention relates to agricultural equipment. More particularly, this invention relates (although is not limited) to a device for configuring a plough between a use configuration and a transport configuration. In at least some embodiments, the device can adjust an angle of a plough, such as a ploughing angle, relative to a ground surface.

BACKGROUND

In broad terms, a plough (or plow) is an agricultural device for disturbing soil in preparation for planting. Ploughs have been used for thousands of years, and the use of ploughs (ploughing) remains an important part of modern agriculture.

Modern ploughs are typically adapted for attachment to tractors or the like, to be towed therebehind during ploughing. It can also frequently be desirable to tow a plough attached to a tractor when not in use for ploughing, such as for transport between different fields to be ploughed.

Some existing ploughs can be configured between a use configuration for ploughing and a transport configuration for transport. However, there are certain challenges or difficulties associated with existing such approaches for plough configuration.

At least certain existing ploughs rely on additional or ancillary frame structures of relatively large size and/or weight for configuration of the plough between a use configuration and a transport configuration. Such relatively large and/or heavy additional or ancillary frame structures can add substantial additional size and/or weight to ploughs.

At least certain existing ploughs rely on relatively complex additional or ancillary mechanisms for configuration of the plough between a use configuration and a transport configuration. Such relatively complex additional or ancillary mechanisms can be prone to malfunction or failure and/or can add significantly to maintenance requirements.

With the preceding in mind, it would be desirable to develop new approaches suitable for configuring ploughs between a use configuration and a transport configuration. It would be particularly desirable, in at least some instances, if such new approaches addressed difficulties or challenges associated with existing approaches, such as those described above.

The reference to prior art in the background is not and should not be taken as an acknowledgement or suggestion that the referenced prior art forms part of the common general knowledge in Australia or in any other country.

SUMMARY

In a first broad form, the present invention provides a device for configuring industrial equipment between a use configuration and a transport configuration. Suitably, the industrial equipment is towable industrial equipment. In embodiments, the industrial equipment is agricultural equipment. In embodiments, the industrial equipment is a plough.

A first aspect of the invention provides a device for configuring industrial equipment between a use configuration and a transport configuration, the device comprising:

an elongated support; and an actuator connected with the elongated support, wherein the elongated support is for sliding connection with the industrial equipment, and the actuator is for actuating connection with the industrial equipment, and wherein when the elongated support and the actuator are connected with the industrial equipment, actuation of the actuator can slide the industrial equipment relative to the elongated support to configure the industrial equipment between the use configuration and the transport configuration.

Suitably, the device of the first aspect is for configuring towable industrial equipment between the use configuration and the transport configuration. In embodiments, the device of the first aspect is for configuring agricultural equipment between the use configuration and the transport configuration. In embodiments, the device of the first aspect is for configuring a plough between the use configuration and the transport configuration.

Suitably, the industrial equipment, such as the plough, configurable using the device of the first aspect between the use configuration and the transport configuration, is relatively lowered in the use configuration, and relatively raised in the transport configuration.

Suitably, the elongated support of the device of the first aspect is substantially rigid.

In embodiments, the elongated support is for sliding connection with the industrial equipment at or towards a front portion of the industrial equipment. In embodiments, the elongated support is for sliding connection with the industrial equipment at or towards a top portion of the industrial equipment.

Suitably, the elongated support comprises a first support end; and a second support end. In embodiments, the elongated support is for sliding connection with the industrial equipment at or towards the first support end.

The elongated support may comprise one or more support portions. The elongated support, or the one or more support portions thereof, may be or comprise one or more bars.

In embodiments, the elongated support comprises a body support portion; and a head support portion. The head support portion may be longitudinally offset with the body support portion. In embodiments, the elongated support comprises a linking support portion extending between the body support portion and the head support portion.

In embodiments, the body support portion of the elongated support comprises a first body support portion end; and a second body support portion end. The second body support portion end may be the second end of the elongated support.

In embodiments, the head support portion of the elongated support comprises a first head support portion end; and a second head support portion end. The first head support portion end may be the first end of the elongated support.

Suitably, the elongated support comprises one or more slide connectors for sliding connection with the industrial equipment. The slide connectors may be or comprise one or more protrusions. In embodiments, the one or more slide connectors are of a slide plate. In embodiments, the one or more slide connectors are or comprise protruding edges of the slide plate.

In embodiments, the one or more slide connectors are at or towards the first end of the elongated support. The one or more slide connectors may be of or attached with the head support portion of the elongated support.

In embodiments, the elongated support of the device of the first aspect is for sliding connection with the industrial equipment via a guide plate. The guide plate may be of the device of the first aspect.

Suitably, the guide plate is connected or connectable with the industrial equipment. In embodiments, the guide plate is connected or for connection with the industrial equipment at or towards a front portion of the industrial equipment. In embodiments, the guide plate is connected or for connection with the industrial equipment at or towards a top portion of the industrial equipment.

In embodiments, the guide plate comprises an aperture, channel, or slot for sliding connection with the elongated support. In embodiments, the guide plate comprises an aperture, channel, or slot for sliding connection with the one or more slide connectors of the elongated support.

The actuator of the device of the first aspect may be a linear actuator. In embodiments, the actuator is a hydraulic actuator. In embodiments, the actuator is a linear hydraulic actuator.

Suitably, the actuator of the device of the first aspect comprises an actuator body. The actuator body may be or comprise a hydraulic cylinder, or the like. Suitably, the actuator body is connected with the elongated support.

In embodiments, the actuator comprises an actuator shaft. The actuator shaft may be or comprise a hydraulic shaft, or the like. Suitably, the actuator shaft is for connection with the industrial equipment.

In embodiments, the actuator is connected with the elongated support between the first support end and the second support end. In embodiments, the actuator is connected with the linking support portion of the elongated support.

The actuator may be attached with an actuator mount of or extending from the elongated support. In embodiments, the actuator mount with which the actuator is attached extends from the linking support portion of the elongated support.

In embodiments, the actuator of the device of the first aspect is movably connected with the elongated support. The actuator may be in pinned connection with the elongated support. The actuator may be pivotally connected with the elongated support. In embodiments, the actuator is pivotally attached with the actuator mount of or extending from the elongated support.

The actuator may be for connection with the industrial equipment at or towards a front portion of the industrial equipment. The actuator may be for connection with the industrial equipment at or towards a top portion of the industrial equipment. In embodiments, the actuator is for connection with the industrial equipment via the guide plate.

In embodiments, the actuator of the device of the first aspect is for movable connection with the industrial equipment. The actuator may be for pinned connection with the industrial equipment. The actuator may be for pivotal connection with the industrial equipment. In embodiments, the actuator is for pinned or pivotal connection with the industrial equipment via the guide plate.

In embodiments, the elongated support of the device of the first aspect is for connection with a towing vehicle. In embodiments, the towing vehicle is a tractor. In embodiments, the elongated support is for connection with the towing vehicle at or near to the second support end of the elongated support.

In embodiments, the elongated support is for connection at or towards a rear portion of the towing vehicle. In embodiments, the elongated support, or the second support end thereof, is for connection at or towards a bottom portion of the towing vehicle.

In embodiments, the elongated support comprises one or more tow connectors for connection with the towing vehicle. The one or more tow connectors may be or comprise one or more apertures or channels. In embodiments, the one or more tow connectors are for connection with the towing vehicle via a tow hitch. The tow hitch may be of the device of the first aspect.

Suitably, the one or more tow connectors of the elongated support of the device of the first aspect are at or near the second end of the elongated support. The one or more tow connectors may be of or attached with the body portion of the elongated support.

In embodiments, the elongated support is for movable connection with the towing vehicle. In embodiments, the elongated support is for multiaxial connection with the towing vehicle. The elongated support may be for ball and socket connection with the towing vehicle.

In embodiments, the elongated support is for movable, multiaxial, or ball and socket connection with the towing vehicle via a tow hitch.

The device of the first aspect may comprise a towing brace. Suitably, the towing brace is substantially rigid. In embodiments, the towing brace comprises one or more bars. The towing brace may comprise an A-frame arrangement.

Suitably, the towing brace of the device of the first aspect is connected with the elongated support. In embodiments, a first end of the towing brace is connected with the elongated support. In embodiments, the first end of the towing brace connected with the elongated support is a narrower end of the A-frame arrangement.

In embodiments, the towing brace is connected with the elongated support at or near the second support end of the elongated support. The towing brace may be connected with the elongated support via the one or more tow connectors.

In embodiments, the towing brace is releasably connected with the elongated support. In embodiments, the towing brace is adjustably connected with the elongated support. The towing brace may be releasably, adjustable fastenable with the elongated support.

In embodiments, the towing brace is connected with the elongated support via the tow hitch. The tow hitch may be of or attached with the towing brace. In embodiments, the tow hitch is of or attached with the first end of the towing brace.

Suitably, the towing brace is connectable with the industrial equipment. In embodiments, a second end of the towing brace is connectable with the industrial equipment. In embodiments, the second end of the towing brace connected with the industrial equipment is a wider end of the A-frame arrangement.

In embodiments, the towing brace is for connection at or towards a front portion of the industrial equipment. In embodiments, the towing brace is for connection at or towards a bottom portion of the industrial equipment.

In embodiments, the towing brace is for movable connection with the industrial equipment. The towing brace may be for pinned connection with the industrial equipment. The towing brace may be for pivotal connection with the industrial equipment.

Suitably, the towing brace is connectable with the towing vehicle. In embodiments, the first end of the towing brace is connectable with the industrial equipment. The towing brace may be connected with the towing vehicle via the tow hitch.

In embodiments, the towing brace is for connection at or towards a rear portion of the towing vehicle. In embodiments, the towing brace, or the first end thereof, is for connection at or towards a bottom portion of the towing vehicle.

In embodiments, the towing brace is for movable connection with the towing vehicle. In embodiments, the towing brace is for multiaxial connection with the towing vehicle. The towing brace may be for ball and socket connection with the towing vehicle.

In embodiments, the device of the first form or first aspect can adjust an orientation of the industrial equipment in the transport configuration and/or the use configuration. In embodiments, the orientation of the industrial equipment is an angle of the industrial equipment or a part thereof relative to a ground surface.

In embodiments, when the elongated support and the actuator of the device of the first aspect are connected with a plough, and the plough is in the use configuration, actuation of the actuator can slide the plough relative to the elongated support to adjust a ploughing angle of the plough.

A second aspect of the invention provides a system comprising industrial equipment; and a device for configuring the industrial equipment between a use configuration and a transport configuration, the device comprising:

an elongated support; and an actuator connected with the elongated support, wherein the elongated support is in sliding connection with the industrial equipment, and the actuator is in actuating connection with the industrial equipment, and wherein actuation of the actuator slides the industrial equipment relative to the elongated support to configure the industrial equipment between the use configuration and the transport configuration.

Suitably, the industrial equipment according to the system of the second aspect is towable industrial equipment. In embodiments, the industrial equipment is agricultural equipment. In embodiments, the industrial equipment is a plough.

In embodiments, the industrial equipment of the system of the second aspect comprises one or more retractable wheels. Suitably, the one or more retractable wheels are configurable between an extended configuration and a retracted configuration.

In embodiments, when the industrial equipment is in the use configuration, the one or more retractable wheels are in the retracted configuration. In embodiments, when the industrial equipment is in the transport configuration, the one or more retractable wheels are in the extended configuration.

In embodiments, the system of the second aspect comprises a towing brace, wherein the elongated support and the industrial equipment are connected with the towing brace. The towing brace may be of the device for configuring the industrial equipment between the use configuration and the transport configuration.

In embodiments, the system of the second aspect comprises a towing vehicle, wherein the elongated support is connected with the towing vehicle. In embodiments, the towing vehicle is a tractor.

In embodiments, the device of the system of the second aspect can adjust an orientation of the industrial equipment in the transport configuration and/or the use configuration. In embodiments, the orientation of the industrial equipment is an angle of the industrial equipment or a part thereof relative to a ground surface.

In embodiments, the industrial equipment of the system of the second aspect is a plough and, when the plough is in the use configuration, actuation of the actuator can slide the plough relative to the elongated support to adjust a ploughing angle of the plough.

A third aspect of the invention provides a method of configuring industrial equipment between a use configuration and a transport configuration, the method including a step of actuating an actuator connected to the industrial equipment, wherein the actuator is connected with an elongated support and the elongated support is connected with the industrial equipment, and wherein actuation of the actuator slides the industrial equipment relative to the elongated support, to configure the industrial equipment between the use configuration and the transport configuration.

In embodiments, the industrial equipment according to the method of the third aspect is towable equipment. The industrial equipment may be agricultural equipment. In embodiments, the agricultural equipment is a plough.

In embodiments, the industrial equipment comprises one or more retractable wheels. Suitably, the one or more retractable wheels are configurable between an extended configuration and a retracted configuration.

In embodiments, the method of the third aspect includes a step of configuring the one or more retractable wheels of the industrial equipment between the retracted configuration and the extended configuration to configure the industrial equipment between the use configuration and the transport configuration.

In embodiments, the method of the third aspect includes a step of adjusting an orientation of the industrial equipment in the transport configuration and/or the use configuration. In embodiments, the orientation of the industrial equipment is an angle of the industrial equipment or a part thereof relative to a ground surface.

In embodiments, the industrial equipment according to the method of the third aspect is a plough, and the method includes a step of actuating the actuator when the plough is in the use configuration, wherein the actuation of the actuator slides the plough relative to the elongated support to adjust a ploughing angle of the plough.

BRIEF DESCRIPTION OF THE DRAWINGS

The invention will be described hereinafter with reference to typical embodiments illustrated in the drawings and wherein:

In FIG. 1A, plough 5 is in a transport configuration.

In FIG. 2A, plough 5 is in a use configuration.

DETAILED DESCRIPTION

Figure 1A:
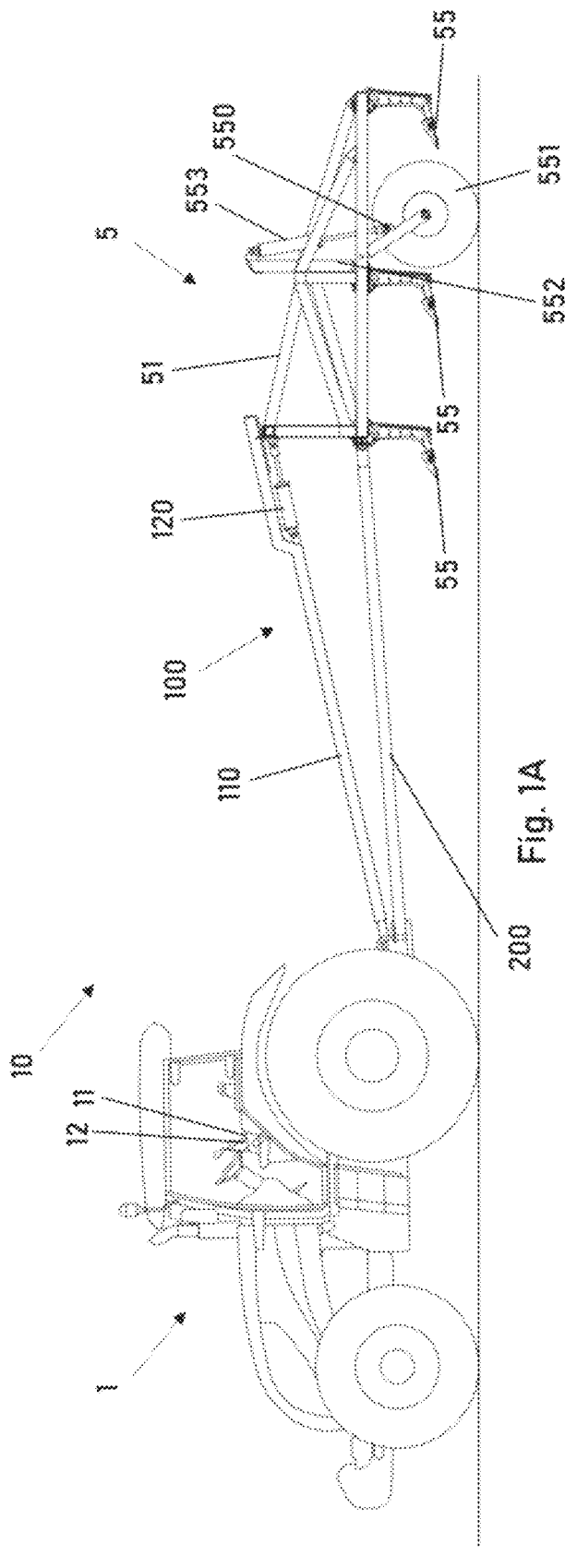
FIG. 1A shows a side view of an embodiment of a system according to an aspect of the invention, system 10. System 10 comprises an embodiment of a device according to an aspect of the invention, device 100, connected to plough 5 and tractor 1.
Figure 2A:
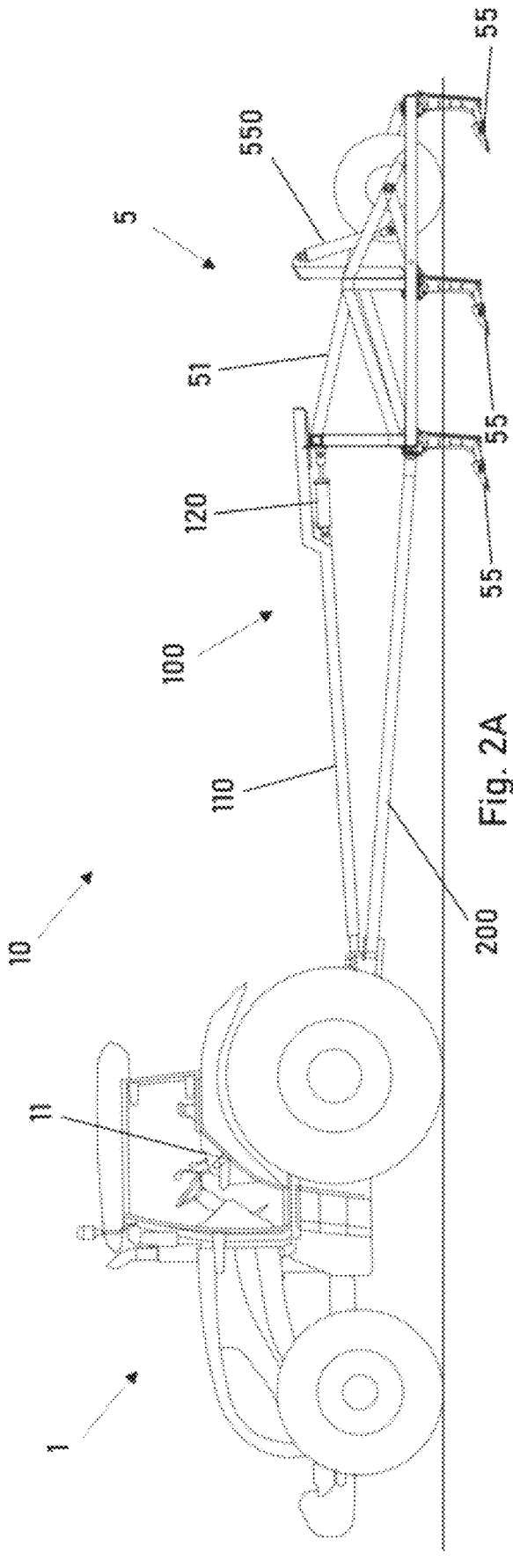
FIG. 2A shows another side view of system 10.

FIGS. 1A and 2A show a system according to a typical embodiment of an aspect of the invention, system 10. System 10 comprises tractor 1; plough 5; and a device according to a typical embodiment of an aspect of the invention, device 100. Device 100 is a device for configuring a suitable plough, such as plough 5, between a transport configuration and a use configuration.

Figure 1B:
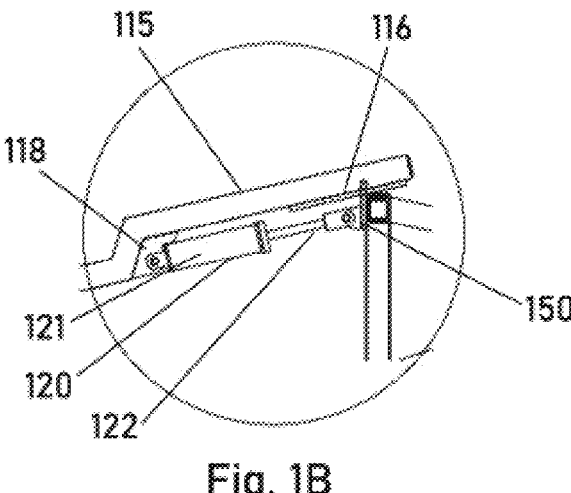
FIG. 1B shows an enlarged view of actuator 120 of FIG. 1A.
Figure 2B:
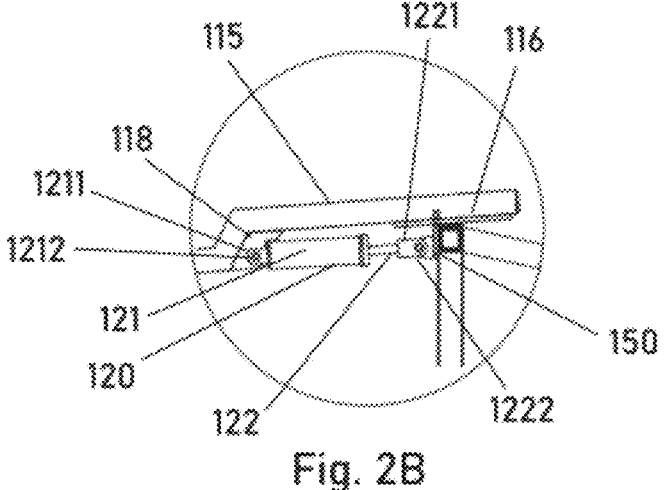
FIG. 2B shows an enlarged view of actuator 120 of FIG. 2A.
Figures 3A, 3B, 3C:
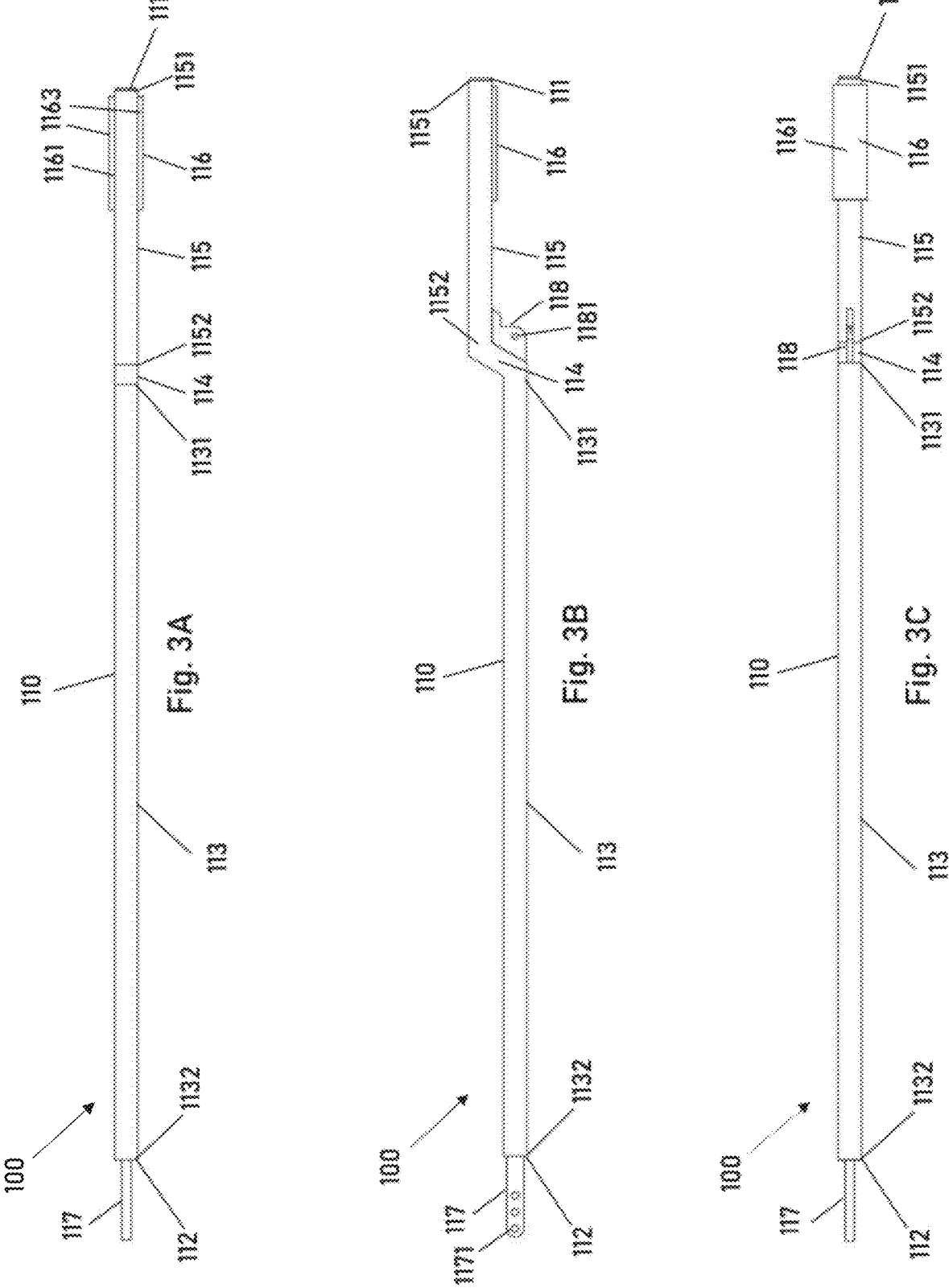
FIGS. 3A, 3B, 3C, and 3D show top (FIG. 3A), side (FIG. 3B), bottom (FIG. 3C), and front (FIG. 3D) views of an elongated support of device 100, elongated support 110.
Figure 3D:
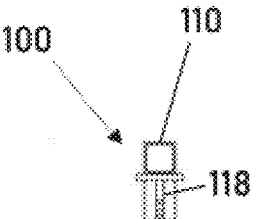
Figures 4A, 4B, 4C:
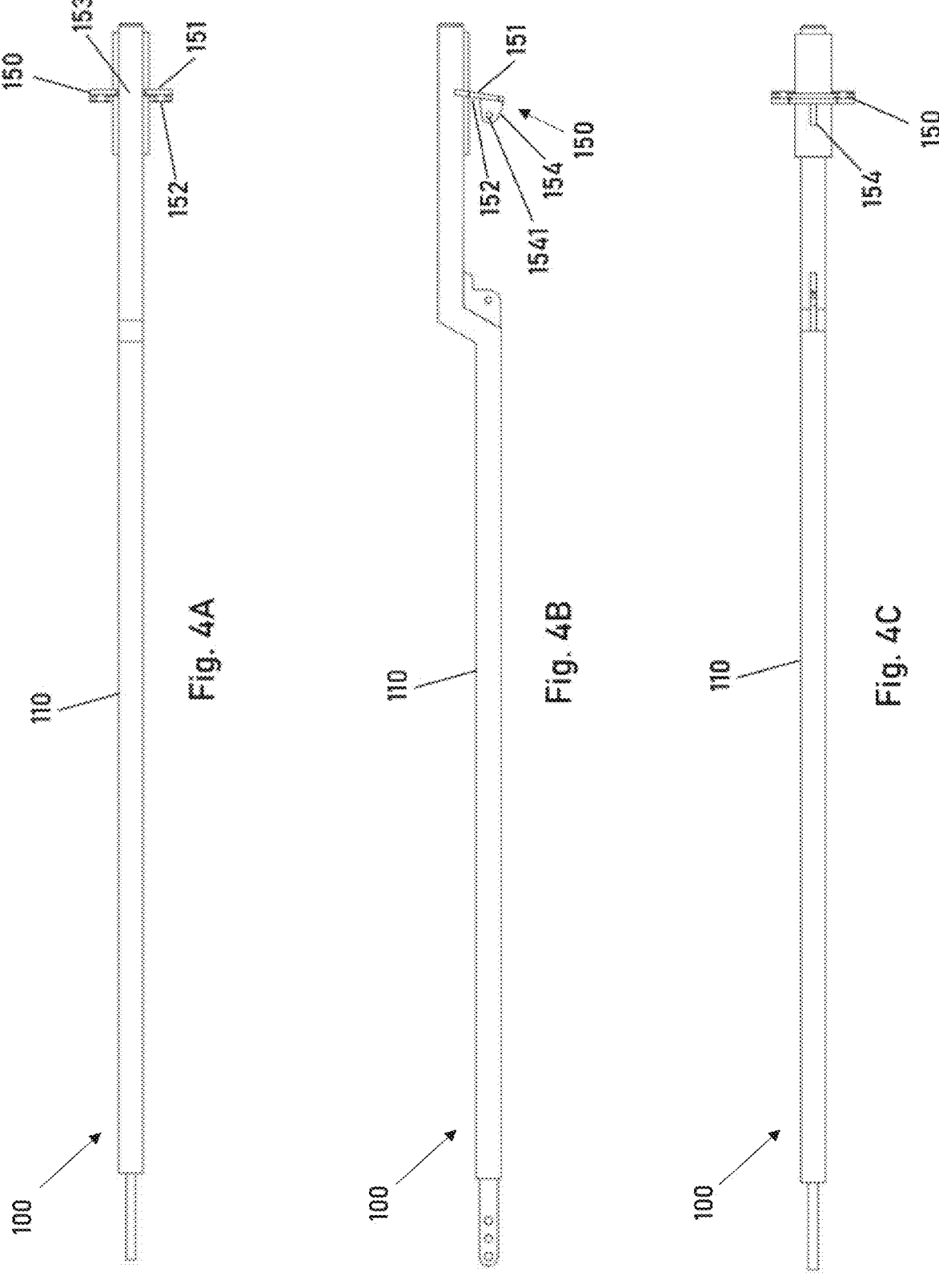
FIGS. 4A, 4B, 4C, and 4D show top (FIG. 4A), side (FIG. 4B), bottom (FIG. 4C), and front (FIG. 4D) views of elongated support 110 connected with an embodiment of a guide plate, guide plate 150.
Figure 4D:
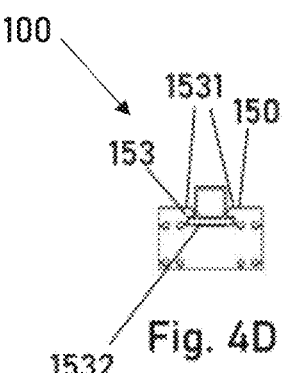
Figure 5:
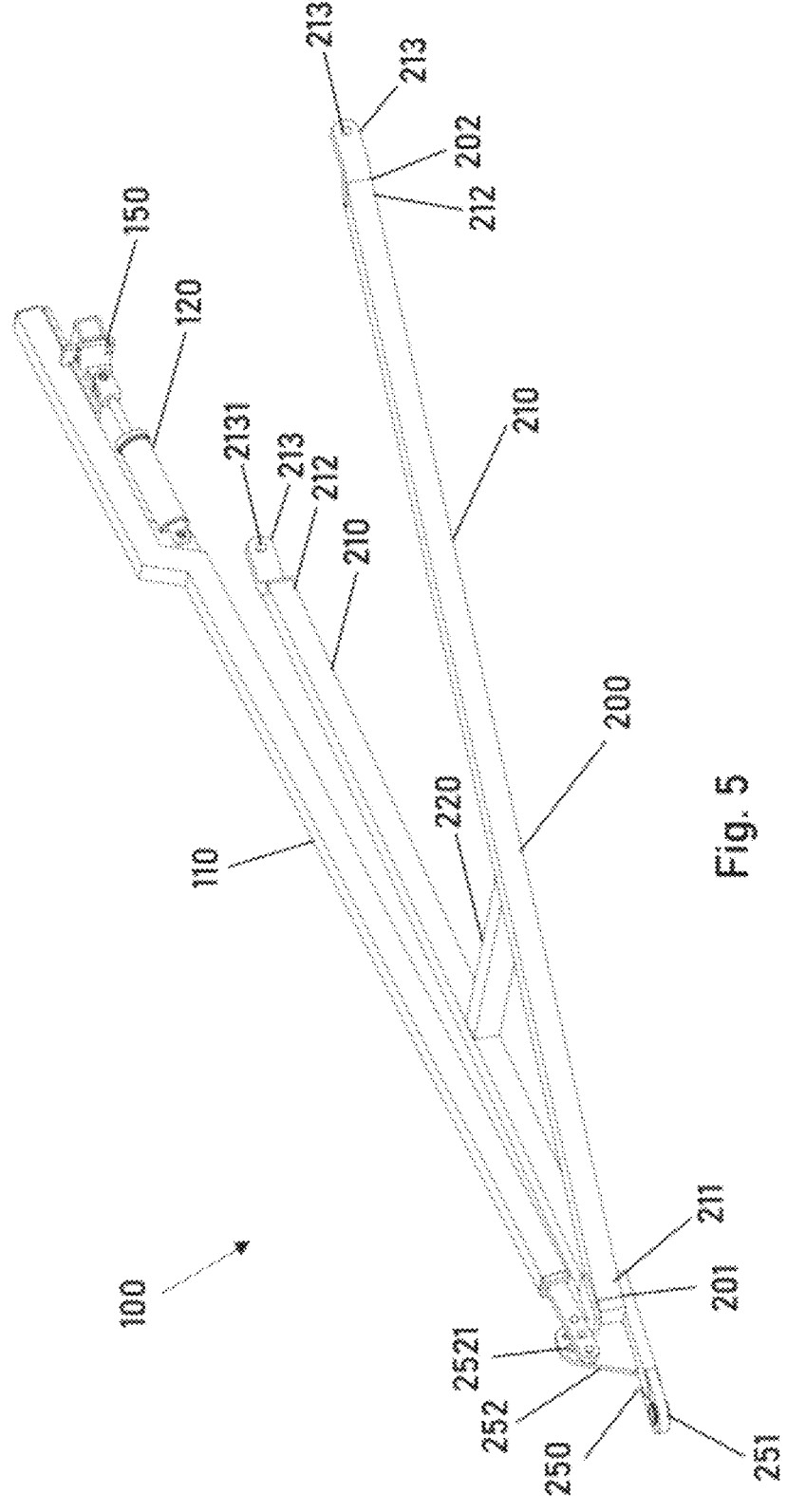
FIG. 5 shows a side perspective view of device 100.
Figures 6A, 6B:
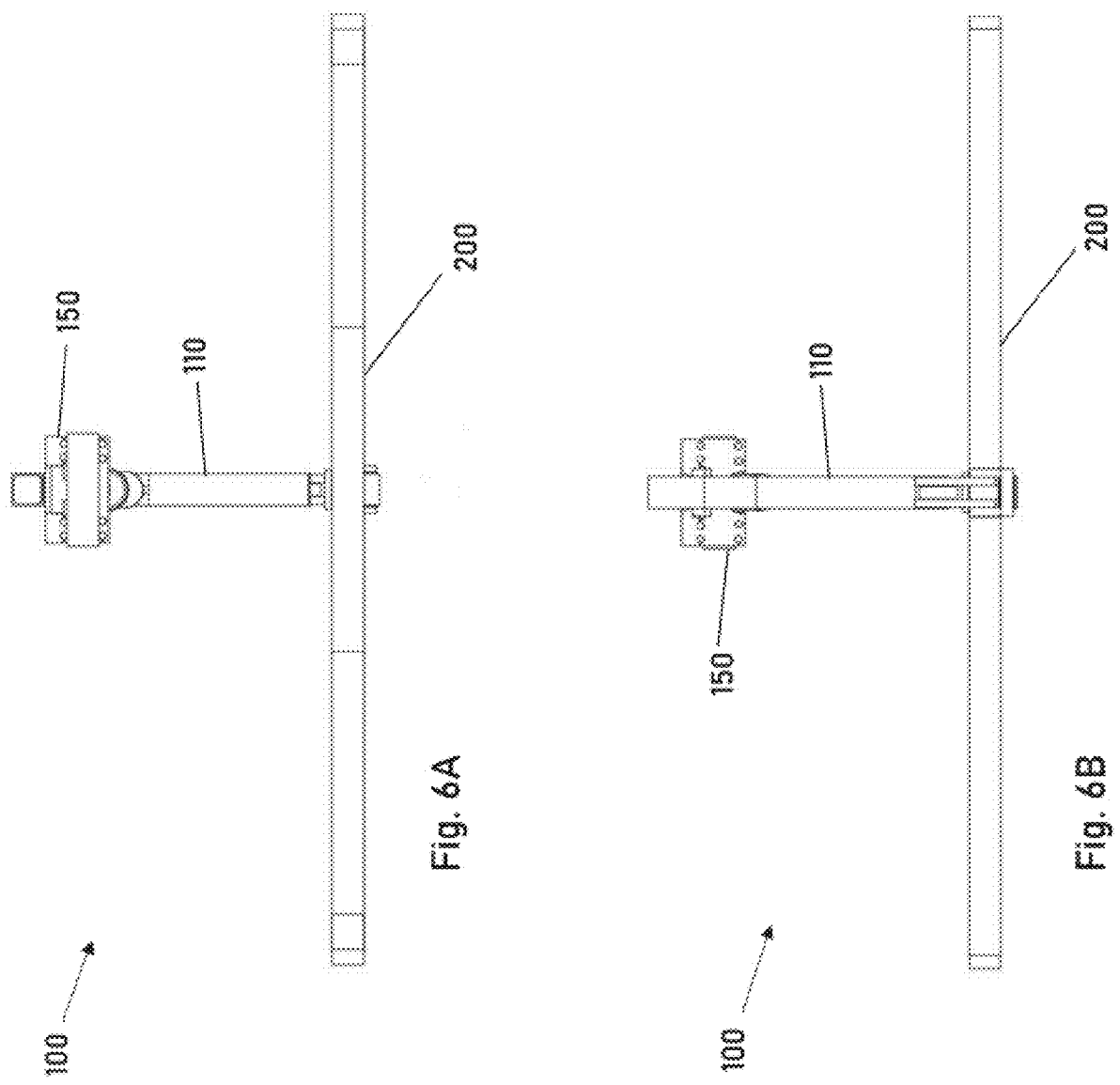
FIGS. 6A and 6B show front (FIG. 6A) and rear (FIG. 6B) views of device 100.
Figures 7A, 7B:
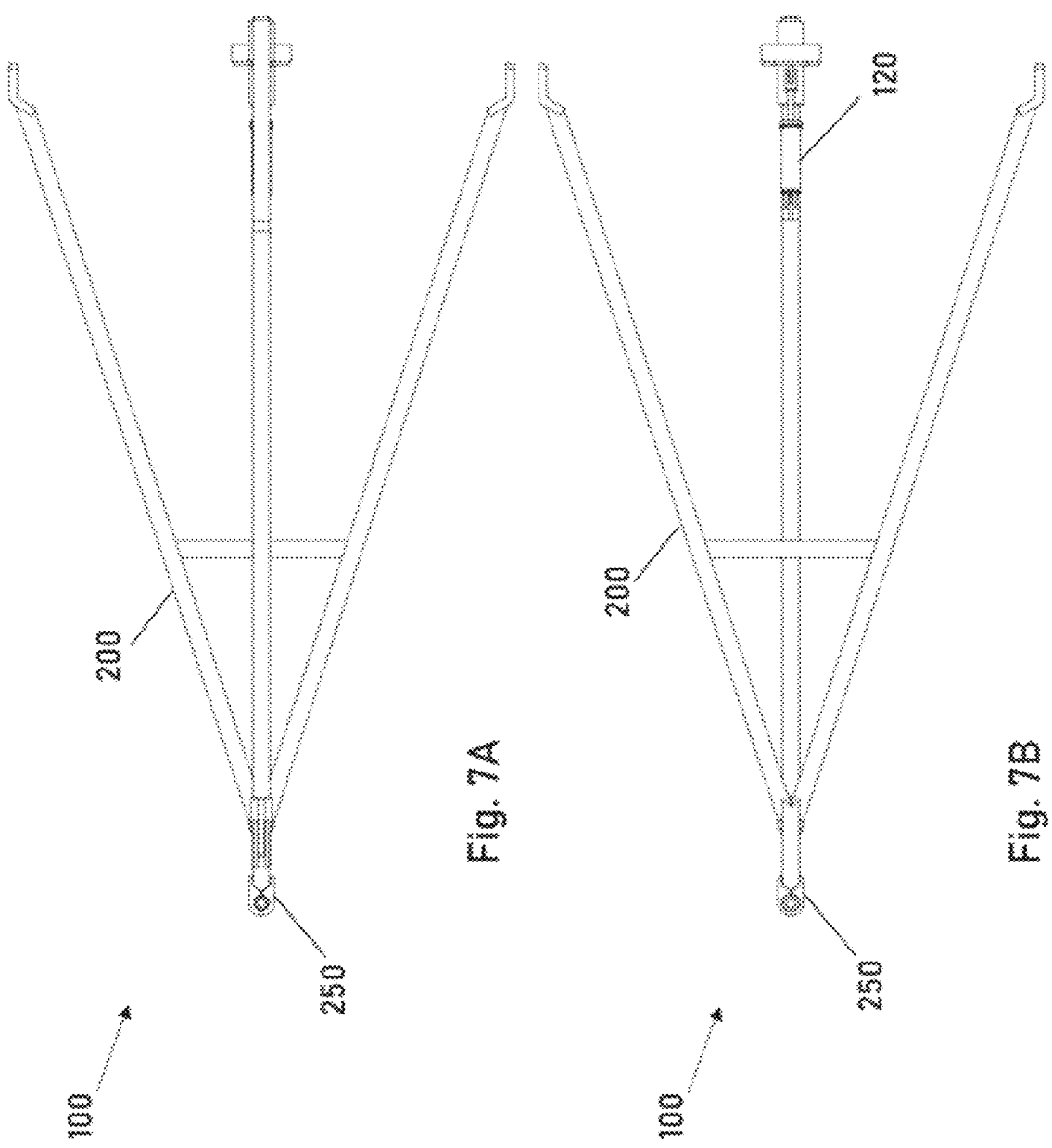
FIGS. 7A and 7B show top (FIG. 7A) and bottom (FIG. 7B) views of device 100.

In FIGS. 1A and 1B, plough 5 has been configured using device 100 in a transport configuration, wherein blades 55 of plough 5 are elevated away from a ground surface. In FIGS. 2A and 2B, plough 5 has been configured using device 100 in a use configuration, wherein blades 55 are inserted in the ground surface.

Device 100 of system 10 will now be described in detail with reference to FIGS. 1A-8C.

Device 100 comprises elongated support 110; and actuator 120.

As seen in FIGS. 3A-3D, elongated support 110 comprises first support end 111; second support end 112; body support portion 113; linking support portion 114; and head support portion 115. Together, body support portion 113, linking support portion 114, and head support portion 115 form a substantially rigid, bar-like support, with head support portion 115 longitudinally offset from body support portion 113.

Body support portion 113 of elongated support 110 comprises first body support portion end 1131; and second body support portion end 1132. It will be understood that second body support portion end 1132 of body support portion 113 is also second support end 112 of elongated support 110.

Head support portion 115 of elongated support 110 comprises first head support portion end 1151; and second head support portion end 1152. It will be understood that first head support portion end 1151 of head support portion 115 is also first support portion end 111 of elongated support 110.

Linking support portion 114 of elongated support 110 extends between first body support portion end 1131 of body support portion 113, and second support head support portion end 1152 of head support portion 115.

Elongated support 110 of device 100 further comprises slide plate 116; tow connector 117; and actuator mount 118.

Slide plate 116 is a substantially rectangular plate comprising plate upper surface 1161; plate lower surface 1162; and plate side protrusions 1163. Upper surface 1161 of slide plate 116 is attached with a lower surface of head support portion 115 near to first support portion end 111. Plate side protrusions 1163 extend laterally from elongated support 110.

Tow connector 117 is a blade or tab-like projection extending from second support portion end 112. Tow connector 117 comprises a plurality of circular apertures 1171.

Actuator mount 118 is a substantially flat, bracket-like mount comprising circular aperture 1181. Actuator mount 118 is attached with a lower surface of linking support portion 114 of elongated support, and a lower surface of head support portion 115 of elongated support near to second head support portion end 1152.

As seen in FIGS. 4A-4D, elongated support 110 is slidably connectable with guide plate 150. Guide plate 150 may be considered a component of device 100, or a separate component of system 10.

Guide plate 150 is a substantially rectangular plate comprising front surface 151; rear surface 152; slot 153; and flange 154. Slot 153 is towards an upper edge of guide plate 150 and is for receiving slide plate 116. Flange 154 extends from rear surface 152 of guide plate 150 and comprises circular aperture 1541.

As shown in FIGS. 4A-4D, slot 153 of guide plate 150 comprises upper catches 1531; and lower sliding surface 1532. Slot 153 may comprise one or more reinforced surfaces against which slide plate 116 slides. In some embodiments, guide plate 150 comprises one or more wear-resistant pads or ramps at sliding surface 1532 (not shown). The one or more wear-resistant pads or ramps may be towards side edge(s) of slot 153.

Figures 8A, 8B, 8C:
FIGS. 8A, 8B, and 8C show side views of device 100 in a lowered configuration (FIG. 8A), a level configuration (FIG. 8B), and a raised configuration (FIG. 8C).

With reference to FIGS. 8A-8C, it will be appreciated that: when device 100 is in a lowered configuration as shown in FIG. 8A, slide plate 116 is substantially perpendicular relative to guide plate 150; when device 100 is in a raised configuration as shown in FIG. 8C, slide plate 116 is about 30° from perpendicular relative to guide plate 150; and when device 100 is in a level configuration as shown in FIG. 8B, slide plate 116 is about 15° from perpendicular relative to guide plate 150.

In some embodiments, guide plate 150 comprises, or is connected with, one or more fulcrum supports (not shown) for guiding angle of slide plate 116 relative to guide plate 150 as device 100 slides through slot 153 between lowered, level, and raised configurations as shown in FIGS. 8A-8C. The one or more fulcrum supports may be substantially rounded support(s). The one or more fulcrum supports may be adjacent upper catch(es) 1531 of guide plate 150.

As seen in FIGS. 1B and 2B, actuator 120 of device 100 comprises actuator body 121; and actuator shaft 122. Typically, actuator 120 is a hydraulic actuator wherein actuator body 121 comprises a hydraulic cylinder.

Actuator body 121 comprises tab-like actuator body connector 1211, comprising circular aperture 1212. Actuator body 121 of actuator 120 is pivotally attached to actuator mount 118 of elongated support 120 via actuator body connector 1211 in a pin or bolt arrangement or the like.

Actuator shaft 122 comprises shaft head 1221, comprising circular aperture 1222. Actuator shaft 122 of actuator 120 is pivotally attached to flange 1541 of guide plate 150 via shaft head 1221 in a pin or bolt arrangement or the like.

As seen in FIGS. 5-7B, elongated support 110 is adjustably connectable with towing brace 200. Towing brace 200 may be considered a component of device 100, or a separate component of system 10.

Towing brace 200 is a substantially rigid A-frame brace comprising first and second brace arms 210; and brace crossbar 220.

Arms 210 of towing brace 200 are supported by brace crossbar 220 between narrower end 201 and wider end 202 of towing brace 200. First ends 211 of arms 210 of towing brace 200 join at narrower end 201 of towing brace 200. Second ends 212 of arms 210 are separated at wider end 202 of towing brace 200. Brace tabs 213 extend from second ends 212 of arms 210. Brace tabs 213 comprise circular apertures 2131.

First ends 211 of arms 210 are attached to tow hitch 250. Tow hitch 250 may be considered a component of towing brace 200 or a separate component of device 100 or system 10.

Tow hitch 250 comprises vehicle connector 251; and support mount 252. Vehicle connector 251 is adapted for multiaxial connection with a towing vehicle such as tractor 1, such as via ball-and-socket attachment or the like.

Support mount 252 is adapted for adjustable connection with elongated support 110. More particularly, support mount 252 comprises a plurality of circular apertures 2521, with which tow connector 117 of elongated support 110 can be adjustably fastened such as using bolts or the like.

Any suitable materials may be used for construction of device 100. Relatively hard-wearing materials resilient to degradation by environmental exposure are generally desirable. As hereinabove described, elongated support 110 and tow brace 200 are substantially rigid. Typically, elongated support 110 and tow brace 200 are formed at least primarily from structural steel.

Typical use of device 100 and system 10 will now be described.

In use, device 100 is connected to tractor 1 and plough 5 to form system 10.

First support end 111 of elongated support 110 of device 100 is slidably connected with plough 5. More particularly, slide plate 116 of elongated support 110 is inserted into slot 153 of guide plate 150 with guide plate 150 connected to plough 5, to thereby slidably connect elongated support 110 with plough 5. As seen in FIGS. 1A-2B, guide plate 150 is attached to an upper, front portion of frame 51 of plough 5.

Second support end 112 of elongated support 110 of device 100 is multiaxially connected with tractor 1. More particularly, tow connector 117 is fastened to support mount 252 of tow hitch 250, and vehicle connector 251 is multiaxially attached to tractor 1 or a tow ball or the like thereof such as in a ball and socket arrangement.

In use, towing brace 200 is connected with tractor 1 and plough 5 to stabilise and brace connection of elongated support 110 to tractor 1 and plough 5.

Wider end 202 of towing brace 200 is pivotally connected with plough 5. More particularly, brace tabs 213 are pivotally attached at respective positions to a lower, front portion of frame 51 of plough 5.

Narrower end 201 of towing brace 200 is multiaxially connected with tractor 1. More particularly, tow hitch 250 is of, or fixedly attached, to towing brace 200, and vehicle connector 251 is multiaxially attached to tractor 1 or a tow ball of the like thereof such as in a ball and socket arrangement.

In use, actuator 120 of device 100 is connected with controller 11 of tractor 1. Typically, controller 11 is a hydraulic controller. Typically, actuator 120 is hydraulically connected with controller 11.

In use as part of system 10, device 100 can configure plough 5 between a use configuration suitable for ploughing with plough 5 towed by tractor 1, and a transport configuration suitable for moving plough 5 towed by tractor 1 between separate ploughing locations.

In use, controller 11 of tractor 1 can extend and retract actuator shaft 122 of actuator 120. For configuration of plough 5 from the use configuration to the transport configuration, controller 11 extends actuator shaft 122. For configuration of plough 5 from the transport configuration to the use configuration, controller 11 retracts actuator shaft 122.

With reference to FIGS. 1A-2B, it will be appreciated that when plough 5 is in the use configuration, extension of actuator shaft 122 slides guide plate 150 attached to plough 5 along slide plate 116 of elongated support 110 in a first direction away from tractor 1. Sliding of guide plate 150 along slide plate 116 in the first direction away from tractor 1 facilitates configuration of plough 5 from the use configuration to the transport configuration.

With reference to FIGS. 1A-2B, it will be appreciated that when plough 5 is in the transport configuration, retraction of actuator shaft 122 slides guide plate 150 attached to plough 5 along slide plate 116 of elongated support 110 in a second direction towards tractor 1. Sliding of guide plate 150 along slide plate 116 in the second direction towards tractor 1 facilitates configuration of plough 5 from the transport configuration to the use configuration.

As hereinabove described, FIGS. 8A-8C show device 100 in a lowered configuration (see FIG. 8A), a raised configuration (see FIG. 8C), and a level configuration (see FIG. 8B). It will be appreciated that when plough 5 is in the use configuration as part of system 1, device 100 is in a lowered configuration (e.g. FIG. 8A); and when plough 5 is in the transport configuration as part of system 1, device 100 is in a raised configuration (e.g. FIG. 8C).

With reference to FIGS. 1A-2B and 8A-8C, it will be appreciated that, together with sliding of guide plate 150 along slide plate 116 of elongated support 100, configuration of plough 5 between the use configuration and the transport configuration is facilitated by: multiaxial movement of vehicle connector 251 of tow hitch 250 attached to tractor 1; pivotal movement of brace tabs 213 of towing brace 200 attached to plough 5; pivotal movement of actuator body 121 of actuator 120 attached to actuator mount 118 of elongated support 100; and pivotal movement of actuator shaft 122 of actuator 120 attached to flange 154 of guide plate 150.

As seen in FIGS. 1A and 2A, plough 5 comprises retractable wheel arrangement 550. Wheel arrangement 550 of plough 5 comprises wheel 551; and foldable wheel frame 552. Foldable wheel frame 552 comprises configurable wheel support 553. Typically, configurable wheel support 553 is a linear actuator. More typically, configurable wheel support 553 is a hydraulic linear actuator.

When plough 5 is in the use configuration, retractable wheel arrangement 550 is in a retracted configuration wherein foldable wheel frame 552 is folded and configurable wheel support 553 is retracted, as shown in FIG. 2A. When plough 5 is in the transport configuration, retractable wheel arrangement 550 is in an extended configuration wherein foldable wheel frame 552 is unfolded and configurable wheel support 553 is extended, as shown in FIG. 1A.

Typically, configurable wheel support 553 of retractable wheel arrangement 550 is connected with a controller. The controller may be hydraulic controller 11 or a similar controller of tractor 1, such as controller 12. In typical embodiments wherein configurable wheel support 553 is connected with a controller, the controller can retract and extend configurable wheel support 553 to assist with configuration of plough 5 between the use configuration and the transport configuration.

More particularly, when plough 5 is in the transport configuration, retraction of configurable wheel support 553 with the controller retracts retractable wheel arrangement 550, lowering plough 5 for configuration in the use configuration; and, when plough 5 is in the use configuration, extension of configurable wheel support 553 with the controller extends retractable wheel arrangement 550, raising plough 5 for configuration in the transport configuration.

It will be appreciated that, at least for typical embodiments of system 10, configuration of plough 5 between the use configuration and the transport configuration involves actuation of both actuator 120 of device 100 and linear support 553 of retractable wheel arrangement 550 of plough 5. Suitably, actuator 120 of device 100 and linear support 553 are actuated concurrently or substantially concurrently for configuration of plough 5 between the use configuration and the transport configuration.

It will be further appreciated that at least typical embodiments of system 10 can be used to adjust ploughing angle of plough 5 in the use configuration. More particularly, for typical embodiments of system 10, when plough 5 is in the use configuration, ploughing angle of plough 5 can be adjusted by actuation of actuator 120 of device 100 while retractable wheel arrangement 550 remains retracted.

It will be appreciated that, in typical embodiments of system 10, when actuator 120 is actuated to retract or extend actuator shaft 122 when plough 5 is in the use configuration and retractable wheel arrangement 550 remains retracted, sliding of guide plate 150 along slide plate 116, pivotal movement of brace tabs 213 of towing brace 200 attached to plough 5, pivotal movement of actuator body 121 of actuator 120 attached to actuator mount 118 of elongated support 100, and pivotal movement of actuator shaft 122 of actuator 120 attached to flange 154 of guide plate 150 adjusts angle of plough 5 to ground surface, thereby adjusting ploughing angle of blades 55 within the ground.

Advantageously, device 100 can configure a suitable plough, such as plough 5, between a use configuration and a transport configuration with only limited ancillary frame structure. With reference to FIGS. 1A-2B and 5, and the description herein, it will be appreciated that device 100 does not substantially add to height or width of space occupied by plough 5 when device 100 is connected to plough 5 as part of system 10.

Advantageously, device 100 can configure a suitable plough, such as plough 5, between a use configuration and a transport configuration with only limited mechanical complexity. With reference to FIGS. 1A-2B and 5, it will be appreciated that configuration with device 100 involves relatively simple and reliable linear actuation in combination with relatively simple sliding and pivoting mechanical connections.

Advantageously, at least typical embodiments of device 100 can adjust ploughing angle of a suitable plough, such as plough 5, when the plough is in a use configuration, and can do so with only limited ancillary frame structure and mechanical complexity.

It will be understood generally that the above description of embodiments of the invention is provided for purposes of description to one of ordinary skill in the related art. It is not intended to be exhaustive or to limit the invention to a single disclosed embodiment. In some instances, well-known components and/or processes have not been described in detail, so as not to obscure the embodiments described herein.

As described, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations that have been discussed herein, and other embodiments that fall within the spirit and scope of the invention.

It will be appreciated that typical ploughing systems 10 as described in detail herein comprise a retractable wheel arrangement comprising an actuator, the retractable wheel arrangement controllable to assist with configuration of the plough between the use configuration and the transport configuration. It will be further appreciated that such typical arrangements can be advantageous to allow for system 10 to adjust ploughing angle when a plough is in the use configuration.

It will be understood, however, that inclusion of an actuatable, retractable wheel arrangement is not to be considered essential according to aspects and embodiments of the invention. The skilled person will appreciate that need for and/or advantages of an actuatable, retractable wheel arrangement will depend, at least in part, on the specific industrial equipment (such as plough) to be configured. It will be further appreciated that different retractable wheel arrangements, such as using alternative actuators or gas lift supports or similar, may be suitable or desirable in some circumstances.

Adjustment of ploughing angle using typical embodiments of devices of the invention has been described when the device is connected to a plough and the plough is in the use configuration. It will be appreciated that, using typical embodiments of devices of the invention, an angle of industrial equipment (such as a plough) or a component thereof (such as plough blades) relative to a ground surface may similarly be adjusted when the industrial equipment is in the transport configuration, or a position intermediate the use configuration and the transport configuration.

In this specification, the use of the terms "suitable" and "suitably", and similar terms, is not to be read as implying that a feature or step is essential, although such features or steps may well be preferred.

In this specification, the indefinite articles "a" and "an" are not to be read as singular indefinite articles or as otherwise excluding more than one or more than a single subject to which the indefinite article refers. For example, "a" support includes one support, one or more supports, and a plurality of supports.

In this specification, the terms "comprises", "comprising", "includes", "including", and similar terms, are intended to denote the presence of a stated integer or integers, but not necessarily the exclusion of another integer or other integers, depending on context. That is, a device, system, or method, etc., that comprises or includes stated integer(s) need not have those integer(s) solely, and may well have at least some other integers not stated, depending on context.

In this specification, the terms "consisting essentially of" and "consists essentially of" are intended to mean a non-exclusive inclusion only to the extent that, if additional elements are included beyond those elements recited, the additional elements do not materially alter basic and novel characteristics. That is, a device, system, or method that "consists essentially of" one or more recited elements includes those elements only, or those elements and any additional elements that do not materially alter the basic and novel characteristics of the device, system, or method.

In this specification, terms such as "above" and "below"; "front" and "back"; "top" and "bottom"; "left" and "right"; "horizontal" and "vertical", and the like, may be used for descriptive purposes. However, it will be understood that embodiments can potentially be arranged in various orientations, and that such relative terms are not limiting and may be interchangeable in appropriate circumstances.

In this specification, unless the context requires otherwise, the terms "connection", "connected", "connecting", and the like, are not to be read as limited to direct connections and may also include indirect connections. For example, unless the context requires otherwise, a stated first component "connected" to a stated second component may be connected via, through, or by, one or more unstated components.

The invention claimed is:

1. A device for configuring a plough between a use configuration and a transport configuration, the device comprising:

an elongated support; and an actuator connected with the elongated support, wherein the elongated support is for substantially translational sliding connection with the plough, and the actuator is for actuating connection with the plough, and wherein when the elongated support and the actuator are connected with the plough:

(i) actuation of the actuator can substantially translationally slide the plough relative to the elongated support to configure the plough between the use configuration and the transport configuration, and (ii) when the plough is in the use configuration, actuation of the actuator can substantially translationally slide the plough relative to the elongated support to adjust a ploughing angle of the plough.

2. The device of claim 1, wherein the elongated support comprises a body support portion, a head support portion, and a linking support portion, wherein the head support portion is longitudinally offset with the body support portion and the linking support portion extends between the body support portion and the head support portion.

3. The device of claim 2 wherein the head support portion of the elongated support comprises one or more slide connectors for substantially translational sliding connection with the plough.

4. The device of claim 3, wherein the slide connectors comprise protruding edges of a slide plate of or attached with the head support portion of the elongated support.

5. The device of claim 1, wherein the elongated support is for substantially translational sliding connection with the plough via a guide plate.

6. The device of claim 5, wherein the guide plate comprises a channel or slot for sliding connection with slide connectors of the elongated support.

7. The device of claim 1, wherein a body of the actuator is pivotally connected with the elongated support.

8. The device of claim 1, wherein a shaft of the actuator is for pivotal connection with the plough.

9. The device of claim 1, wherein the actuator is a linear actuator.

10. The device of claim 1, wherein the actuator is a hydraulic actuator.

11. The device of claim 1, wherein a second end of the elongated support is for multiaxial connection with a towing vehicle, such as a tractor.

12. The device of claim 11, wherein the second end of the elongated support is connected with a first end of a towing brace, such as an A-frame towing brace, wherein a second end of the towing brace is for connection with the plough.

13. The device of claim 12, wherein the second end of the towing brace is for pivotal connection with the plough.

14. A system comprising a plough; and a device for configuring the plough between a use configuration and a transport configuration, the device comprising:

an elongated support; and an actuator connected with the elongated support, wherein the elongated support is in substantially translational sliding connection with the plough, and the actuator is in actuating connection with the plough, and wherein:

(i) actuation of the actuator substantially translationally slides the plough relative to the elongated support to thereby configure the plough between the use configuration and the transport configuration, and (ii) when the plough is in the use configuration, actuation of the actuator can substantially translationally slide the plough relative to the elongated support to adjust a ploughing angle of the plough.

15. The system of claim 14 wherein the plough is relatively lowered in the use configuration, and relatively raised in the transport configuration.

16. A method of configuring a plough between a use configuration and a transport configuration, the method including steps of:

(i) actuating an actuator connected to the plough, wherein the actuator is connected with an elongated support and the elongated support is connected with the plough, and wherein actuation of the actuator substantially translationally slides the plough relative to the elongated support, to thereby configure the plough between the use configuration and the transport configuration, and (ii) actuating the actuator when the plough is in the use configuration, wherein the actuation of the actuator substantially translationally slides the plough relative to the elongated support to adjust a ploughing angle of the plough.

17. The method of claim 16 wherein the plough is relatively lowered in the use configuration, and relatively raised in the transport configuration.

* * * * *